(12) United States Patent
Conde

(10) Patent No.: US 11,578,652 B2
(45) Date of Patent: Feb. 14, 2023

(54) COMBINED HEAT AND POWER SYSTEM AND METHOD OF OPERATION

(71) Applicant: ENEXOR ENERGY, LLC, Spring Hill, TN (US)

(72) Inventor: Ricardo Conde, New Salem, MA (US)

(73) Assignee: ENEXOR ENERGY, LLC, Spring Hill, TN (US)

(*) Notice: Subject to any disclaimer, the term of this patent is extended or adjusted under 35 U.S.C. 154(b) by 357 days.

(21) Appl. No.: 16/538,144

(22) Filed: Aug. 12, 2019

(65) Prior Publication Data

US 2021/0047963 A1 Feb. 18, 2021

(51) Int. Cl.
| | |
|---|---|
| *F02C 3/26* | (2006.01) |
| *B01D 45/16* | (2006.01) |
| *B04C 3/06* | (2006.01) |
| *B04C 3/02* | (2006.01) |
| *F23R 5/00* | (2006.01) |

(52) U.S. Cl.
CPC ............ *F02C 3/26* (2013.01); *B01D 45/16* (2013.01); *B04C 3/02* (2013.01); *B04C 3/06* (2013.01); *F23R 5/00* (2013.01)

(58) Field of Classification Search
CPC .................................. F02C 3/26; F23R 5/00
See application file for complete search history.

(56) References Cited

U.S. PATENT DOCUMENTS

| 2,625,791 | A |   | 1/1953  | Yellott |
|---|---|---|---|---|
| 2,861,423 | A | * | 11/1958 | Jerie ................. F23C 3/008 60/39.01 |
| 4,089,631 | A |   | 5/1978  | Giles |
| 5,050,375 | A | * | 9/1991  | Dickinson ......... C02F 11/086 60/39.12 |
| 5,341,637 | A |   | 8/1994  | Hamrick |
| 5,690,709 | A | * | 11/1997 | Barnes ................ B01D 45/12 55/348 |
| 5,720,165 | A | * | 2/1998  | Rizzie ................. F23B 90/06 60/39.464 |
| 6,510,695 | B1| * | 1/2003  | Fisher ................... F02C 3/26 60/780 |
| 6,862,877 | B1| * | 3/2005  | James ................... F02C 3/28 60/39.464 |
| 6,949,436 | B2|   | 9/2005  | Mooney et al. |
| 8,240,123 | B2|   | 8/2012  | Elliott et al. |
| 2008/0245052 | A1 | | 10/2008 | Boyce et al. |

(Continued)

FOREIGN PATENT DOCUMENTS

| CA | 2861423 A1 * | 8/2013 | ........... G06K 9/2027 |
|---|---|---|---|
| WO | 2018191007 A1 | 10/2018 | |

OTHER PUBLICATIONS

International Search Report and Written Opinion for International Application No. PCT/US202044727 dated Jan. 6, 2021; 15 pgs.

*Primary Examiner* — Todd E Manahan
*Assistant Examiner* — Marc J Amar
(74) *Attorney, Agent, or Firm* — Cantor Colburn LLP

(57) ABSTRACT

A combined heat and power system and method of operation is provided. The system includes a combustion chamber configured to directly combust solid organic material. A compressor turbine is fluidly coupled to the combustion chamber. An expansion turbine is fluidly coupled to the combustion chamber. In an embodiment, the system has a low turbine pressure ratio.

5 Claims, 5 Drawing Sheets

(56) References Cited

U.S. PATENT DOCUMENTS

| | | | |
|---|---|---|---|
| 2014/0053458 A1* | 2/2014 | Bar-Ziv | C10B 57/02 |
| | | | 44/589 |
| 2014/0130509 A1* | 5/2014 | Drnevich | F01K 23/067 |
| | | | 60/780 |
| 2014/0157790 A1 | 6/2014 | Forsberg | |
| 2020/0080011 A1* | 3/2020 | Blythe | C10J 3/84 |
| 2022/0025813 A1* | 1/2022 | Stenz | F23C 3/008 |
| | | | 60/39.01 |

* cited by examiner

COMBINED HEAT AND POWER SYSTEM AND METHOD OF OPERATION

TECHNICAL FIELD

The subject matter described herein relates to a combined heat and power system, in particular to a thermal system utilizing waste, organic, and plastic resources and converting it into heat energy used to drive a gas turbine coupled to the thermal system to produce power and a high level of usable waste heat for both low and high temperature thermal applications.

BACKGROUND

Combined heat and power (CHP) systems have been utilized in many forms for over 100 years. The most common are fossil fuel fired systems that use, for example, steam turbines, gas fired turbines and internal combustion engines to produce power. The reject heat from these systems can be used for a wide range of applications such as heating, cooling, and in some cases where the waste heat temperature is high enough, can be used to drive a second cycle. Traditionally, most of the focus for traditional CHP systems has been large fossil fueled fired systems connected to district heating grids. More recently the focus moved to smaller distributed CHP systems where the heat or power generated could be better utilized by the end user. These smaller CHP systems have also been fossil fuel fired systems that commonly use small gas turbines or reciprocating engines to produce power along with usable waste heat from the cycle. Other systems that use Organic Rankine Cycle have also been used, although the quality of the waste heat is relatively low which limits the applications for the heat.

More recently, the focus to use renewable organic waste streams for fuel has been predominant and progressing the technology. Large biomass and municipal solid waste to power systems have been in operation for many decades. The ability to utilize a wide variety of organic sources in a small CHP system (for example, less than 1 MW electric) has been challenging for a number of reasons. There have been many small organic to power conversion technologies that have been utilized to varying degrees of success. Gasification of organics into syngas has been one approach to convert a solid fuel into a hydrocarbon gas for combustion in traditional power systems. Unfortunately, these systems can be costly, especially when scaled to smaller scale applications. In addition, the organic feed stock can present particular challenges in application. For example, depending on the gasification method and conversion efficiencies, the potential energy available in some organics suffers from losses that have an economic impact on the cost of power and heat. Gasification of mixed organic residues is particularly problematic for many gasification systems.

Another method applied for small CHP applications has been to use direct combustion of the organics through an appropriate combustor and using the heat through a heat exchanger to drive an externally fired engine. Traditional externally fired systems include Stirling cycle, Steam Rankine, Organic Rankine, and super critical CO2 cycles. In all of these systems the temperature of the reject heat affects the cycle efficiency. The higher the reject heat temperature the lower the power efficiency. With the exception of the steam cycle, the other thermodynamic cycles typically lose efficiency when producing even hot water at 90° C. However, with the steam cycle, the deficiency is the complexity and cost associated with a high-pressure steam circuit in a small application.

Another method that has been employed more recently is to use an open Brayton cycle gas turbine and introduce heat indirectly through a heat exchanger. Several systems have been tested where a small turbine has been coupled to an organic combustion system. In these systems ambient air is compressed in the compressor of the turbine and then directed to a heat exchanger to preheat the compressor air. The compressed and preheated air is then directed to the hot heat exchanger to be heated by the organic combustion system. The highly heated air is then expanded in the turbine to produce work to turn a generator and generate electricity. Continuing the cycle, the hot turbine gases are used for preheating in the heat exchanger as mentioned earlier. The turbine exhaust hot gases may then be exhausted or directed to a further heat exchanger where combustion air is heated with exhausted combustion gases and directed to the combustion process. In configurations disclosed by the prior art, the turbine utilizes a heat exchanger to preheat compressed ambient air. Furthermore, most existing systems employ a combustion air pre-heater to recover heat from the combustion gases as well as the heat remaining in the turbine exhaust. While these approaches improve the thermal to electric conversion efficiency, it requires multiple heat exchangers and complex piping for routing of the gases in the circuit which may reduce the overall system efficiency.

The effect of the heat exchanger is to raise the temperature of the compressor air prior to the hot heat exchanger. Heat is extracted from the expansion turbine to preheat the compressor air. The compressor air is further heated by the hot heat exchanger where heat is extracted from the combustion gases. Utilizing the heat exchanger reduces the size of the hot heat exchanger. However, it also reduces the amount of heat energy extracted from the combustion gases. In order to achieve high thermal electric efficiency, it is desired to recover as much heat as practicable from the exhaust combustion gases. Since the combustion exhaust gases cannot be directly fed back to the combustion system, a combustion air pre heater is used to recover the heat from the exhaust gases. These losses can be reduced by using the turbine exhaust air as the combustion air, but this still uses the air preheater.

Another challenge for existing systems is related to controlling the temperature of the combustion gases entering the hot heat exchanger. For applications using a Brayton cycle gas turbine, it is desirable to be able to deliver the compressor (or expander) air at the design inlet temperature of the turbine. In many cases this temperature can be as high as 950° C. To achieve this inlet air temperature, heat exchangers are operated near the maximum design temperature limits. In addition, it is desirable to be able to maintain a constant temperature at the heat exchanger. Overheating and temperature variations could cause stresses on the heat exchanger as well as the expansion turbine, while under heating would cause lower inlet temperatures, reducing power and efficiency. Variations in temperature can be a significant concern when combusting mixed fuels that can have very large differences in heat values.

Existing systems also commonly utilize a constant volume feeding system to deliver the solid fuel into the combustion chamber. However, there is no system to determine the heat value of mixed solid fuels as it is fed into the combustion chamber. As the fuel is burned, the higher heat value fuel will cause an increase in temperature of the exhaust gases while the lower heat value fuels will have the opposite effect. As a result, mixed solid fuels create varying gas temperature flows which cannot readily be corrected by adjustment of the feed system.

Another method that has been employed in recent years is to use an open Brayton cycle gas turbine and introduce heat directly through a pressurized combustion system. Several systems have been developed where a large turbine has been coupled to an organic combustion system. In these systems, ambient air is compressed in the compressor of the turbine and then directed to the combustion chamber where solid organic fuel is fed under pressure and produces combustion and heats the gas. The heated combustion exhaust is then passed through and expanded in the turbine to produce work to turn a generator and generate electricity. Large turbines typically operate at high pressure ratios where a heat exchanger is not typically used. The turbine exhaust hot gases may then be exhausted or directed to a further heat exchanger where additional thermal heat can be extracted to produce heat, cooling or process heat needs. This system has not been employed for smaller turbine systems, mainly due to economic reasons.

Still another challenge for direct fired turbine systems is to reduce the amount of particulates exiting the combustion chamber, which can cause erosion of the turbine blades and deposit and foul the heat exchanger and other thermal heat exchangers. In order to reduce the particulates, various methods have been employed including high temperature ceramic filters of varying configurations, electrostatic precipitators and cyclones. The challenge is to provide an adequate particulate removal without introducing a large pressure drop and at an acceptable cost. Ceramic filters have high efficiency but need continual cleaning to reduce the pressure drop, and automated systems are expensive. Reverse flow cyclones have been used and provide adequate removal of particles, although have the drawback of high pressure drop at high gas velocities and efficiency drops as the gas velocity drops and stops functioning below 50% of the maximum design velocity. A uni-flow cyclone can also be used for particulate removal and has the advantage of maintaining higher efficiency down to 25% of the maximum design velocity. Uni-flow cyclones also have much shorter gas residence times which reduces the amount of heat loss through the cyclone wall.

Yet another challenge for organic fuel direct fired turbine systems is a pressurized fuel feed system is needed to introduce the fuel into a pressurized combustion chamber. Several methods have been employed including rotary valve, double rotary valve, double gate valve, double flapper valve and various types of plug feeders. All of these systems have a common deficiency in that hot gas from the combustion chamber can flow in the reverse direction through these valves towards the feed supply. This introduces both an efficiency loss and a potential thermal risk. The reverse flow is due to leakage around a rotary valve or from the dead space between the double gas locks where high pressure, hot gas, flows into the space and then is released to the lower pressure inlet side when the inlet gas lock is opened.

Still another challenge for organic fuel direct fired turbine systems is to provide a combustion chamber and system that meets both the physical and economic parameters that are desired of the power system. It is desired for solid fuel combustion systems to be able to sustain high temperatures in excess of 1000° C. In addition, solid fuels may contain many different inorganic materials such as small metal, rocks and sand, as well as, salts and other minerals. In the case of sand and rocks, these inorganic materials can cause abrasion, and with salts and other minerals can create slag deposits or chemically interact with the combustion chamber material. Traditional solid fuel combustion chambers utilize either castable refractories or fired ceramic components. Refractory material can handle high temperatures, although have several deficiencies. One deficiency is that refractory materials are not very hard and are subject to abrasion. In addition, refractory castings require thick walls to achieve structural stability adding substantial amounts of weight. Additionally, the refractory material needs to be encased in steel to maintain a compressive force on the refractory when the material is hot. Refractory materials are also brittle and subject to thermal stresses that cause cracks in the refractory over time and with thermal cycling. The large thermal mass of refractory materials have a large thermal mass making startup times very long and changes to operating temperatures take longer as well due to the need to reject or absorb heat from the refractory.

Another material used for combustion chambers is silicon carbide, which is a fired ceramic. Silicon carbide can also handle very high temperatures and is extremely hard which resists abrasion. Silicon carbide components can also be made with thinner walls than refractories due to the strength of the fired ceramic. There are some deficiencies with using silicon carbide. One deficiency is that silicon carbide is brittle and subject to thermal stresses. As with refractory materials, making connections with ceramics, in particular mating with metal, is very difficult. With pressurized systems it becomes very expensive to make high temperature connections. Both refractory and silicon carbide components are also subject to damage from transportation where impact shock can cause cracks in the ceramic. Another deficiency is the high cost of firing silicon carbide.

Accordingly, while existing CHP systems were suitable for their intended purpose, the need for improvement remains, particularly in providing a CHP system having the features described herein.

BRIEF DESCRIPTION OF THE DISCLOSURE

According to one aspect of the disclosure, a combined heat and power system is provided. The system comprising: a combustion chamber configured to directly combust solid organic material; a compressor turbine fluidly coupled to the combustion chamber; and an expansion turbine fluidly coupled to the combustion chamber, wherein a turbine pressure ratio is less than 8.

In addition to one or more of the features described herein, or as an alternative, further embodiments of the system may include the turbine pressure ratio being less than 4. In addition to one or more of the features described herein, or as an alternative, further embodiments of the system may include a uni-flow cyclone fluidly coupled between the combustion chamber and the expansion turbine. In addition to one or more of the features described herein, or as an alternative, further embodiments of the system may include a generator operably coupled to the expansion turbine. In addition to one or more of the features described herein, or as an alternative, further embodiments of the system may include a fuel feed system fluidly coupled to the combustion chamber, the fuel feed system having a hopper configured to receive the solid organic material and a feed tube disposed between the hopper and the combustion chamber.

In addition to one or more of the features described herein, or as an alternative, further embodiments of the system may include a metering device, such as a rotary valve, disposed between the hopper and the feed tube, the metering device being configured to selectively flow pressurized gas from the combustion chamber to the hopper. In addition to one or more of the features described herein, or as an alternative, further embodiments of the system may include the hopper being sized to provide fuel to the combustion chamber for 1 to 6 hours of operation. In addition to one or more of the features described herein, or as an alternative, further embodiments of the system may include an ash bin operably coupled to the uni-flow cyclone and fluidly coupled to the hopper by a flow control valve, wherein the flow control valve is configured to flow pressurized air from the hopper to the ash bin prior to the hopper being refilled with solid organic fuel.

In addition to one or more of the features described herein, or as an alternative, further embodiments of the system may include a second cycle system thermally coupled to an output of the expansion turbine. In addition to one or more of the features described herein, or as an alternative, further embodiments of the system may include the second cycle system being one of the following: an organic Rankine cycle, closed regenerative Brayton, Stirling or super critical carbon dioxide (CO2) engines.

According to another aspect of the disclosure, a combustion system is provided. The system comprising: a pressure vessel; a combustion chamber disposed within the pressure vessel, the combustion chamber being configured to combust solid organic material, wherein the combustion chamber and the pressure vessel are arranged to define a space therebetween; a conical plenum disposed within the combustion chamber, the conical plenum being configured to distribute fuel to a perimeter of the combustion chamber; a plurality of plenum tubes extending from the conical plenum and oriented tangentially to a radius of the combustion chamber, the plurality of plenum tubes being configured to lift and suspend the solid organic material and induce a cyclonic flow within the combustion chamber; and a port fluidly coupled between an air source and the space, wherein during operation, air flows from the air source through the port and into the space to provide a thermal break between the combustion chamber and the pressure vessel.

In addition to one or more of the features described herein, or as an alternative, further embodiments of the system may include a particle separator pressure vessel fluidly coupled to receive air flow from the space. In addition to one or more of the features described herein, or as an alternative, further embodiments of the system may include a uni-flow cyclone fluidly coupled to receive combustion gases from the combustion chamber. In addition to one or more of the features described herein, or as an alternative, further embodiments of the system may include a first insulation layer disposed about the combustion chamber.

In addition to one or more of the features described herein, or as an alternative, further embodiments of the system may include a second insulation layer about the uni-flow cyclone. In addition to one or more of the features described herein, or as an alternative, further embodiments of the system may include the first insulation layer and the second insulation layer having a spray refractory or a blanket insulation.

According to yet another aspect of the disclosure, a particle separator. The particle separator comprising: a pressure vessel; at least one uni-flow cyclone disposed within the pressure vessel, the at least one uni-flow cyclone being configured to remove particles larger than 10 microns; a plenum disposed about the at least one uni-flow cyclone within the pressure vessel, the plenum defining a thermal insulation break between the at least one uni-flow cyclone and the pressure vessel; and an ash bin disposed within the pressure vessel adjacent an outlet of the at least one uni-flow cyclone.

In addition to one or more of the features described herein, or as an alternative, further embodiments of the particle separator may include a cyclone ash valve operably coupled to an ash bin outlet, the cyclone ash valve being configured to pneumatically isolate the plurality of uni-flow cyclones. In addition to one or more of the features described herein, or as an alternative, further embodiments of the particle separator may include a water-cooled jacket disposed about the outlet of the ash bin. In addition to one or more of the features described herein, or as an alternative, further embodiments of the particle separator may include a conduit coupled between the cyclone ash valve and the ash bin.

According to yet another aspect of the disclosure, a pressurized feed system is provided. The pressurized feed system comprising: a fuel hopper having a hollow interior and configured to hold material under pressure; a gas valve configured to seal the pressurized feed system; a metering device configured to meter the material flowing therethrough; a pressurized auger operationally coupled between the fuel hopper and the rotary feed valve; a feed tube operably coupled to the metering device opposite the pressurized auger.

In addition to one or more of the features described herein, or as an alternative, further embodiments of the system may include a solenoid air valve fluidly coupled to the fuel hopper, the solenoid air valve being configured to selectively release pressurized air from the fuel hopper. In addition to one or more of the features described herein, or as an alternative, further embodiments of the system may include a cyclone ash valve fluidly coupled to the solenoid air valve. In addition to one or more of the features described herein, or as an alternative, further embodiments of the system may include the metering device being a rotary feed valve.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
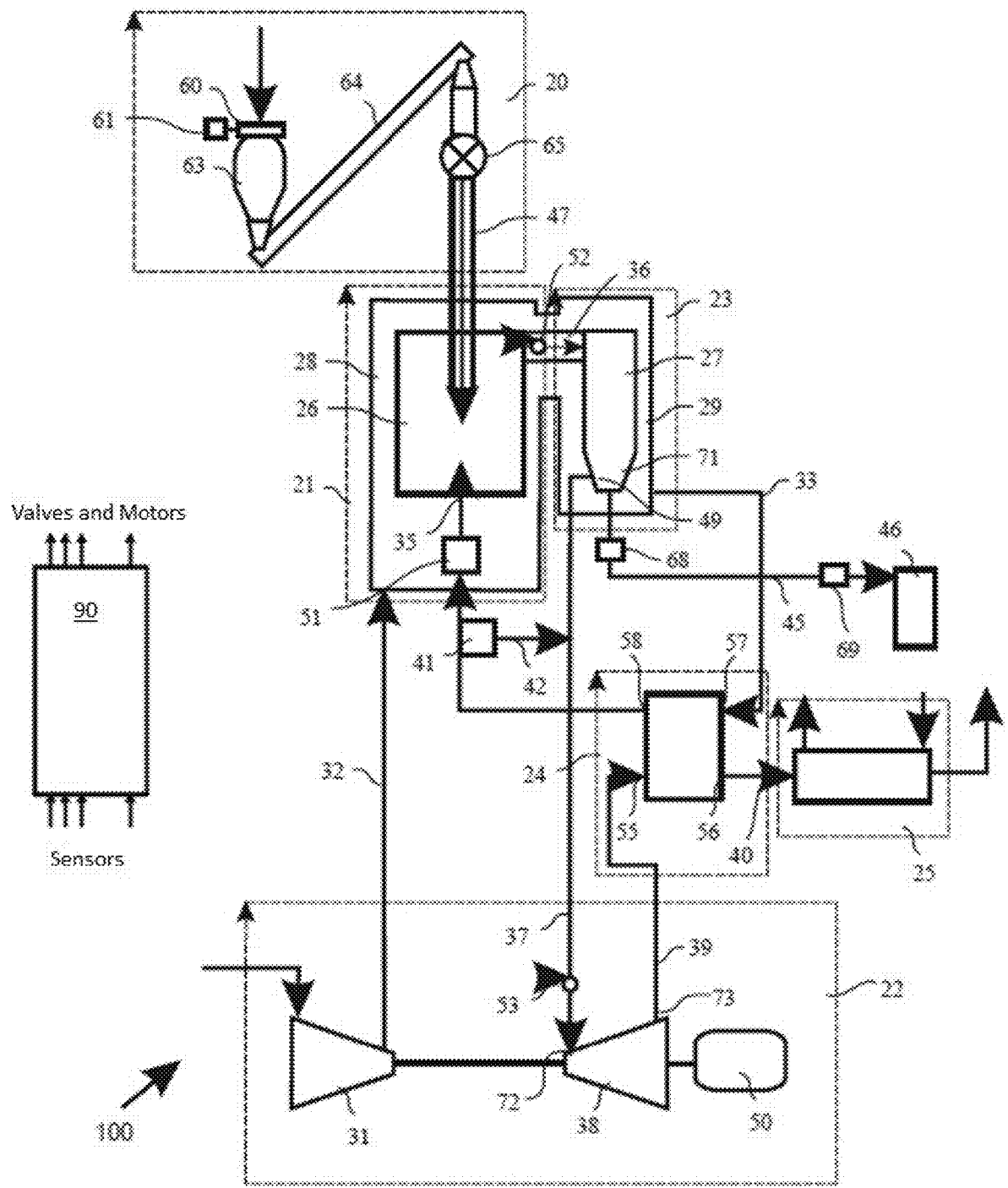
FIG. 1 is a schematic illustration of a combined heat and power system according to an embodiment.

The detailed description explains embodiments of the disclosure, together with advantages and features, by way of example with reference to the drawings.

DETAILED DESCRIPTION OF THE INVENTION

Described herein in one or more embodiments is a combined heat and power system, utilizing waste organic resources and converting it into heat energy used to drive a gas turbine coupled to the thermal system to produce power and a high level of usable waste heat for both low and high temperature thermal applications.

One or more embodiments herein provide for a system and method for a solid fuel, direct fired, open Brayton cycle. This method employs a low-pressure ratio gas turbine comprising a compressor for compressing air and a turbine to expand the exhaust gas and produce useful work. In an embodiment, the pressure ratio is less than 8. In another embodiment, the pressure ratio is less than 4. In this system, filtered ambient air is compressed in the compressor of the turbine and then directed to a pressure vessel which encompasses the combustion chamber. The compressor air is used to cool the combustion chamber components which are made of metal. The cooling air also creates a thermal break between the combustion chamber and the outer pressure vessel wall. The compressor air then passes to a second pressure vessel which encompasses a multi uni-flow cyclone. The cooling air is used to cool the metal cyclone and to provide a thermal break to the outer vessel. The air leaving the second vessel then enters the high-pressure side of a heat exchanger where the gas is heated by heat transfer from the exhaust gases exiting the turbine. The heated high-pressure air is directed into the combustion chamber where solid organic fuel is fed under pressure and produces combustion to add heat to the gas. The heated combustion exhaust is then directed through a passageway to the multi uniflow cyclone where particulates are removed from the hot gas. The hot gas exiting the cyclone then goes to the expansion turbine to produce work to turn a generator and generate electricity. Continuing the cycle, the hot gas exiting the turbine goes to the low-pressure inlet of the heat exchanger where it transfers heat to the compressor air. The turbine exhaust hot gases may then be exhausted or directed to a further heat exchanger where additional thermal heat can be extracted to produce additional work, heat, cooling or process heat needs.

The advantages of a high efficiency, small power, solid fuel CHP system is the ability to utilize waste organic fuel stocks that would be too expensive to transport to a centralized location required by a large system. In other words, embodiments of the CHP system provided herein allow for the utilization of waste organic fuel stocks close to the source where they are generated. Utilizing these resources on site provides a low cost of fuel which produces lower cost electricity. Distributed power generation also reduces infrastructure costs associated with using the turbine waste heat for heating and cooling.

One feature of the described embodiments is to configure a low pressure ratio turbine system with a combustion chamber capable of combusting solid organic material which functions to heat the compressor air, after exiting the heat exchanger, from the discharge temperature to the maximum temperature needed at the turbine inlet. The combustion chamber includes a mechanical device to introduce solid fuel under pressure into the combustion zone. The material coming into contact with the hot gases mixed with compressor air ignites the material in a continuous process. Direct combustion of organic material has the advantage of eliminating the hot heat exchanger used in indirect combustion systems where heat is transferred into the working gas through a heat exchanger. This improves thermo-electric efficiency and reduces capital and maintenance cost.

Another feature of the described embodiments of a combustion system includes a temperature sensor, such as a thermocouple, to measure the temperature of the combustion exhaust gas leaving the combustion chamber. In an embodiment, a high temperature cyclone particle separation system is used to remove about 99% of particles above about 10 microns in size from the combustion gases to reduce damage to the expansion turbine and fouling of the heat exchanger. In order to obtain a desired level of combustion, it is desired to achieve a combustion gas temperature of at least 1000° C. Higher temperatures are desired up to the point where NOx formation can become an emissions limitation. In some embodiments, the combustion gas temperature is generally higher than the maximum temperature limit for the turbine inlet. The hot gas entering the cyclone separator flows through a duct which has a port for introducing a secondary gas. This gas can be any available gas stream with a lower temperature than the combustion gas. One source would be compressor air flowing through the pressure vessel encompassing the cyclone. Another air flow that can also be used is the compressor air exiting the heat exchanger, which is at a higher temperature than the air exiting the compressor but lower than the turbine inlet temperature. A flow control valve is attached to the port to control the amount of mass and heat energy entering the combustion air flow. The secondary gas flow provides for lowering the combustion gas temperature to the desired turbine inlet temperature and adjusting for fluctuations in gas temperature. A second thermocouple, which measures the combustion gas temperature leaving the cyclone, sends a signal to the flow control valve to increase or decrease the flow of gas into the system and adjust the temperature of the combustion gases entering the turbine.

Yet another feature of the described embodiments is a combustion chamber that is made from nickel alloy steel and capable of withstanding temperatures up to 1100° C. The advantages of a metallic combustion chamber are lower cost, less weight and higher thermal and mechanical shock resistance compared to refractory or ceramic components. Another feature of the described embodiments includes coating the internal surfaces of the metallic combustion chamber with a ceramic coating to improve abrasion, chemical and oxidation resistance. These coatings include Ytrium/Zirconium or Aluminum oxides as well as other coatings. Another feature of the described embodiments includes a combustion chamber, enclosed in a pressure vessel where secondary cooling air is passed through an open plenum surrounding the combustion chamber. The pressure vessel provides for isolating the combustion process within the combustion chamber under pressure while eliminating the force of the pressure on the combustion chamber components. The outer pressure vessel functions to maintain pressure at lower temperatures with the effect of creating a substantially zero-pressure differential between the outside and inside of the combustion chamber. The pressure vessel is pressurized by compressor air flowing from the turbine into the pressure vessel enclosing the combustion chamber and then flowing through a connecting passage to the cyclone pressure vessel. The purpose of the cooling air is to reduce the insulation requirement around the combustion chamber by 80%. The addition of heat to the cooling air is kept to a minimum since addition of heat reduces the efficiency of the heat exchanger and overall thermo-electric efficiency. Yet another feature of the described embodiments is a combustion chamber which includes a conical shaped combustion chamber bottom. The conical shape functions to distribute organic feed material from the center feed tube to the outer edge of the combustion chamber. At the base of the conical form are a plurality of combustion air ports, oriented near tangentially to the outer radius of the combustion chamber. The ports function to create a turbulent cyclonic flow within the combustion chamber and to lift the organic material into suspension within the combustion zone. Another feature of the described embodiments is a combustion chamber which maintains the organic material in suspension during combustion and moves all of the ash material out of the combustion chamber and into the cyclonic particle separator.

Yet another feature of the described embodiments is a combustion chamber that includes a mechanical feed system to deliver solid fuel to the chamber under pressure. One feature of the described embodiment includes a metering device, such as a rotary valve for example, to create a pressure seal and meter the fuel into the combustion chamber, a pressurized rotary feed auger, a pressurized feed hopper and a dome valve. The rotary valve does not create a perfect seal as there is gas leakage around the internal barrel as well as reverse flow of gas from the empty vane cavity after releasing material transfers to the feed side of the valve. In operation, organic material fills the hopper with the dome valve open and under atmospheric pressure. A level sensor in the hopper sends a signal when the hopper is full to close the dome valve. Once the valve is closed the hopper, feed auger and connecting components starts to pressurize by means of the leakage around the rotary valve. Depending on the size of the hopper, the system can take between 5 and 15 minutes to pressurize. Once the pressure in the feed system equalizes with the combustion chamber pressure there is very little additional reverse flow (e.g. ~2 cubic feet per hour), thus keeping hot gases from continuously flowing towards the fuel. The advantages of this system are that it does not require a separate compressor to pressurize the feed system and drastically reduces the effective leakage, improving efficiency. The feed auger transports the feed fuel to the top of the rotary valve where is it fed under gravity. A second level sensor in the hopper sends a signal when the fuel level is low and in need to refill. Another feature of the pressurized feed system is when the system is ready to refill, the gas from the feed system needs to be depressurized before opening the dome valve. The compressed air from the feed system can be used as the motive force to transport ash from the particle separator to the ash bin. The advantage of this is pneumatic systems can transport ash over long distances and additionally does not require a separate compressor to supply pressurized air. Once the system has depressurized, the dome valve opens and organic material is allowed to fill the hopper and the cycle repeats. The size of the hopper is dependent on how often the ash system needs to be cleared of ash. The ash removal cycle time is dependent on the feed material and can vary from 1 hour for high ash content materials to 6 or more hours for low ash content.

Another feature of the described embodiments includes a plurality of high temperature uni-flow cyclone particle separators coupled to the combustion chamber, to clean the exhaust gas. An ash removal system is provided and includes an isolation valve to close the cyclone bottom during the time the pneumatic system is removing the particles from the cyclone. The multi cyclone is enclosed in a pressure vessel where secondary cooling air is passing through an open plenum surrounding the cyclone. The pressure vessel is pressurized by compressor air flowing from the turbine to the pressure vessel enclosing the combustion chamber and then flowing through a connecting passage to the cyclone pressure vessel. The cooling air allows for the reduction of the insulation requirement around the cyclone by 80%. The addition of heat to the cooling air is kept to a minimum since addition of heat reduces the efficiency of the heat exchanger and overall thermo-electric efficiency. In an embodiment, the multi uni-flow cyclone is comprised of a plurality of small diameter bodies of roughly 4 inches. The cutoff diameter of particles in a cyclone is a function of the cyclone body diameter. The small cyclone body diameter allows for high removal efficiencies for particles down to 10 microns. A plurality of clones are combined in parallel in order to meet the total gas flow requirements.

Further aspects of the described embodiments include an exhaust plenum coupled to the cyclone is provided. A secondary gas port is coupled to the exhaust plenum to allow secondary gas to be introduced. An electronically controlled proportional valve coupled to the gas port is provided to control the mass flow of the secondary gas. A mixing zone is provided in the plenum for the gases to come to temperature equilibrium. A thermocouple is coupled to the plenum after the mixing zone to measure the gas temperature. A thermocouple coupled to the secondary port is provided to measure the gas temperature of the secondary gas. An electronic controller is provided to automatically control the proportional valve.

Moreover, a further feature of the described embodiments includes a heat exchanger coupled to the low pressure, exhaust plenum of a gas turbine. A fluid connection from the cyclone pressure vessel coupled to the high pressure, low temperature side of the heat exchanger. A fluid connection from the high pressure, hot side of the heat exchanger coupled to the inlet of the combustion chamber. A fluid connection from the low pressure, cold side of the heat exchanger coupled to a low temperature heat exchanger is provided to remove residual heat from combustion gases.

For exemplary purposes and without being bound by any theory, the principles of the present disclosure are described herein and reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), a field programmable gate array (FPGA), a digital signal processor (DSP), an electronic circuit, an electronic processor (shared, dedicated, or group) and memory that executes one or more software or firmware programs, a combinational logic circuit, and/or other suitable interfaces and components that provide the described functionality.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 depicts a combined heat and power system (CHP) 100 in accordance with an embodiment. The CHP system 100 utilizes a combustion system 21, an open cycle Brayton gas turbine 22, a high temperature cyclone particle separator 23, a high temperature heat exchanger 24 to transfer heat from the turbine 22 exhaust into the combustion system 21 and optionally a low temperature heat exchanger 25. In some embodiments, the high temperature heat exchanger 24 is optional as discussed below with respect to FIG. 5.

All indirect fired power systems utilize at least one heat exchanger in order to transfer heat from the combustion process to the working gas of the engine. Depending on the type of engine cycle, the heat transfer will occur at different temperatures. For cycles such as Organic Rankine (ORC), the temperature delivered to the engine is rarely above 500° C. and is more typically below 250° C. The advantage of using an ORC is that it can utilize lower temperature heat and subsequently lower cost heat exchangers. The disadvantage is lower efficiency, higher overall cost, and low temperature waste heat rejected from the cycle, typically less than 90° C., which is not readily utilized elsewhere.

Therefore, it is often desirable to use a higher temperature cycle such as an open Brayton cycle to more directly and efficiently utilize the high temperatures available from the combustion system 21. Current, low pressure ratio, Brayton turbine engines are designed to utilize heat at about 950° C. The advantages of the higher temperature cycle are higher efficiency, lower cost and high temperature waste heat rejected from the cycle which can be as high as 650° C. The disadvantage is the need to utilize higher temperature components in the combustion gas path as will be discussed further herein.

In an embodiment, the pressurized feed system 20 further includes, but is not limited to, a gas valve 60 to hermetically seal the fuel feed system, such as a dome valve, disk valve, double disk valve, or a flapper valve for example. A solenoid flow control valve 61 allows for depressurization of the feed system to refill and to allow the evacuating pressurized air to be used as the motive force to remove ash from the ash system. A pressurized feed hopper 63 holds organic solid fuel under pressure, a pressurized feed auger 64 then transports fuel from the hopper 63 to the rotary valve 65. A pressurized rotary feed valve 65 meters the fuel under pressure and creates an air lock between the combustion chamber 26 and the fuel above the rotary valve 65. A vertical fuel feed tube 47 delivers fuel from the rotary valve 65 to the bottom of the combustion chamber 26. During operation, the rotary valve 65 does not create a perfect seal or air lock, in that gas can leak around the internal barrel of the valve as well as the open void space between the vanes which will transport pressurized gas to the low-pressure zone above the valve. In prior art systems this would create an efficiency loss due to compressed air not getting to the turbine to produce work. In addition, these gases can be hot and can cause a thermal risk as the gas propagates towards the fuel.

The present embodiment takes advantage of the leakage to pressurize the feed system, which in some embodiments can take between 5 and 15 minutes. It should be appreciated that as the feed system equalizes in pressure with the combustion chamber, no more reverse flow occurs. The hopper volume can be sized with enough fuel for 1 to 6 hours of operation without having to refill, which effectively reduces the loss of gas from leakage by an average of 90%. An additional advantage of the feed system is when the fuel hopper needs to be refilled, the feed system depressurizes by opening a gas valve and allowing the gas to evacuate through the ash system 45 and remove the ash pneumatically to the ash bin 46. This system and method also reduce the need for or eliminates the need for a secondary compressor to pressurize the feed system and pressurized air source for the ash system 45.

Figure 2:
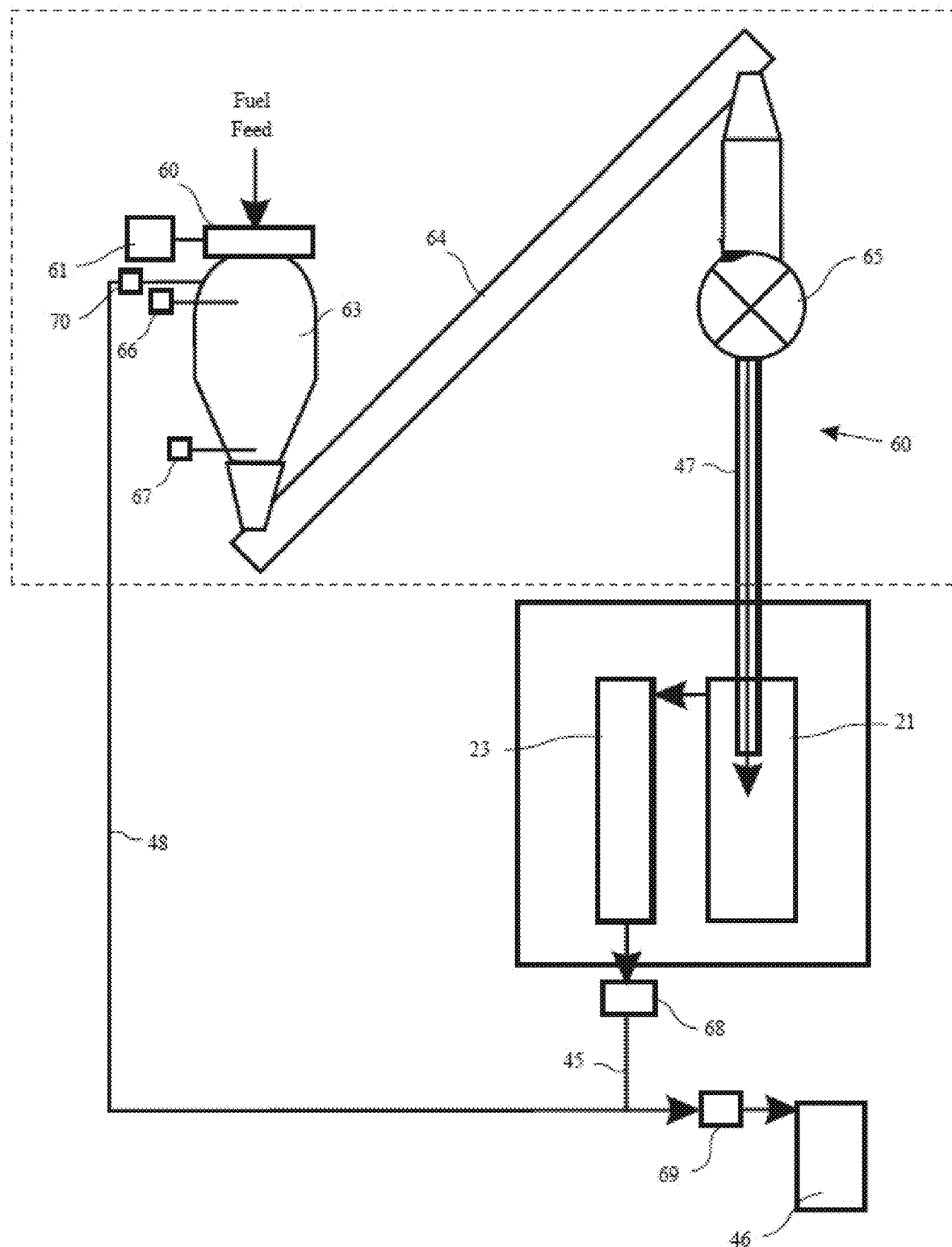
FIG. 2 is a schematic illustration of a portion of the combined heat and power system of FIG. 1.
Figure 3:
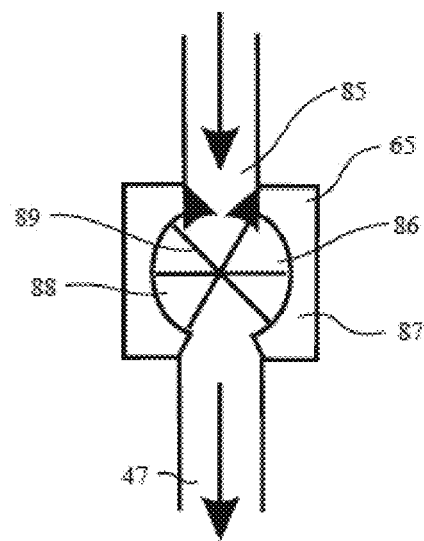
FIG. 3 is a schematic illustration of a rotary feed valve for the combined heat and power system of FIG. 1.
Figure 4:
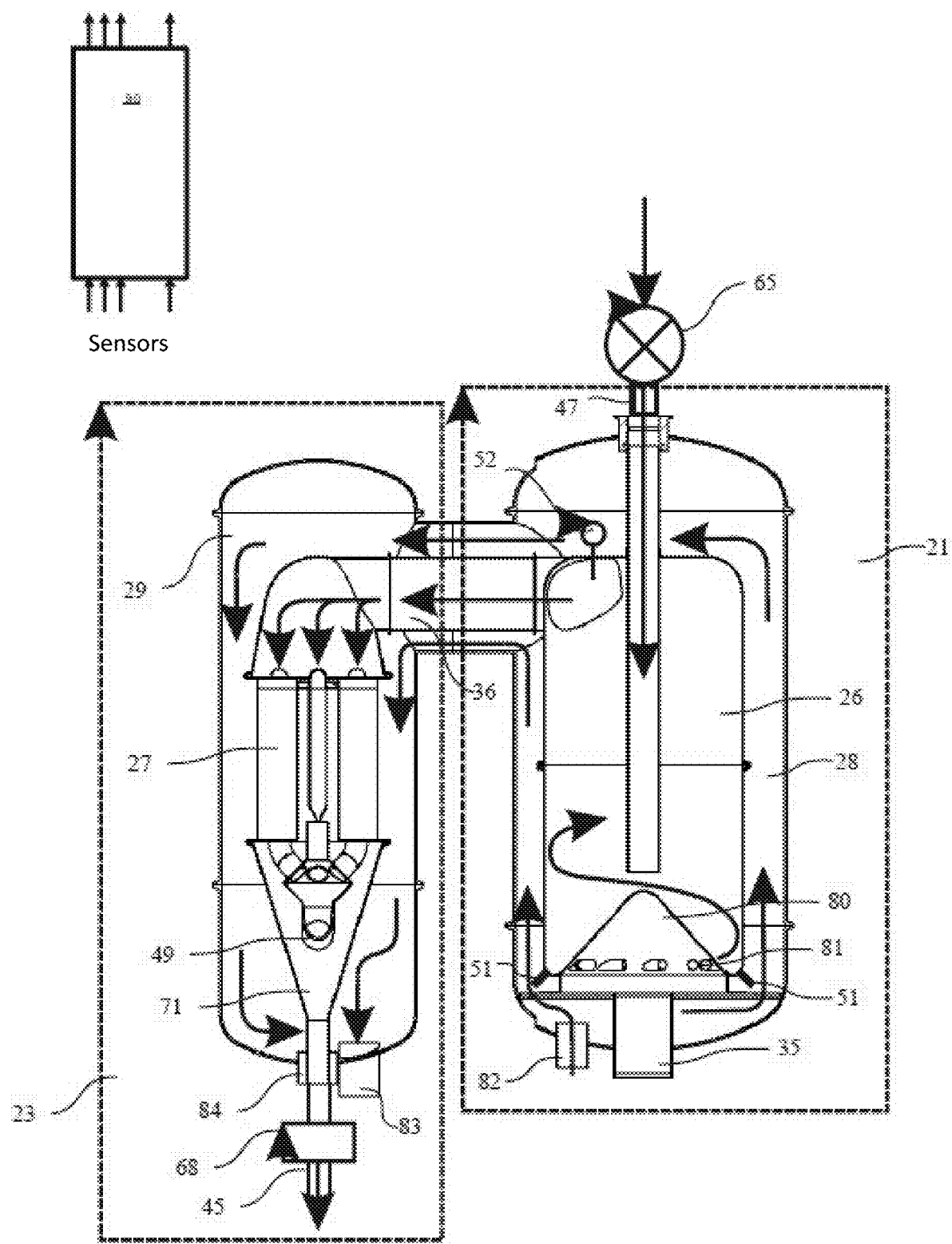
FIG. 4 is a schematic illustration of a combustion chamber and particle separator portion of the combined heat and power system of FIG. 1.

As shown in FIG. 2-4 with continuing reference to FIG. 1, in an embodiment, the combustion system 21 further includes, but is not limited to, a combustion chamber or housing 26 for burning of organic fuel to generate heat, a pressure vessel 28 which houses the combustion chamber 26 and provides pressurized cooling air to flow around the combustion chamber 26. The pressure vessel 28 additionally functions to eliminate the differential pressure on the combustion chamber 26 components. Biomass fuels, that is, organic materials produced in a renewable manner, include, for example, woody fuels such as wood chips, seaweed, agricultural waste, saw grass, and the like, animal wastes, i.e., manures, or even municipal solid waste (MSW). Organic material materials may also include plastic materials. The combustion chamber 26 also includes a feed tube 47 for delivering the fuel into the combustion chamber 26, and an electric heater 51 for delivering heat for startup.

The combustion system 21 also includes a rotary valve 65 for metering the mass of the solid fuel directed into the combustion chamber 26, a port 35 for delivering combustion air from the heat exchanger 24, an optional proportional valve 41 for metering the combustion air from the heat exchanger 24, a temperature sensor e.g., thermocouple 52 to measure combustion gas temperature in the combustion chamber 26, a temperature sensor (e.g., thermocouple 53) to measure combustion exhaust temperature entering the turbine 22, and a controller 90 to receive various sensor inputs such as temperatures, valve positions, speeds and the like, as well as to control the various valves and electric motors in the system 100. The combustion chamber 26 is configured to operate at the combustion gas temperature up to 1100° C. and is constructed of nickel alloy steels such as Hastalloy X and capable of withstanding high thermal and mechanical stresses in comparison with refractory or ceramic components. The nickel alloys are also resistant to the abrasive and corrosive effects of the combustion gas. In an embodiment, the internal surfaces of the combustion chamber are coated with a ceramic composite coating to provide higher abrasion and corrosion resistance and thermal insulative properties. Some examples of coatings are Yttrium/Zirconium or Aluminum oxides. In an embodiment, the external surfaces of the combustion chamber 26 are coated with a layer of insulation to reduce the heat loss from the combustion chamber 26 to the cooling air flowing through the pressure vessel 28. The thermal insulation can be spray refractories or blanket insulation.

In an embodiment, the particle separator 23 further includes a pressure vessel 29 (FIG. 4), housing a plurality of uni-flow cyclone particle separators 27, a disengagement hopper 71 for particulate collection, a cyclone ash valve 68 to pneumatically isolate the cyclone during ash removal, a solenoid flow control valve 70 to allow pressurized air in conduit 48 from the fuel hopper 63 to pneumatically remove particles from the hopper 71, and a solenoid flow control valve 69 to allow the particles to enter the ash bin 46. The particle separator 23 is configured to operate at the combustion gas temperature up to 1100° C. and is constructed of nickel alloy steels such as Hastalloy X, or other nickel alloy steel, and capable of withstanding high thermal and mechanical stresses in comparison with refractory or ceramic components. The nickel alloys are also resistant to the abrasive and corrosive effects of the combustion gas. In an embodiment, the internal surfaces of the cyclone are coated with a ceramic composite coating to provide higher abrasion resistance and thermal insulative properties. Some examples of coatings are Ytrium/Zirconium or Aluminum oxides.

In an embodiment, the external surfaces of the uni-flow cyclone particle separators 27 are coated with a layer of insulation to reduce the heat loss from the Uni-flow cyclone particle separators 27 to the cooling air flowing through the pressure vessel 29. The thermal insulation can be spray refractories or blanket insulation. The cyclone particle separator 23 also includes an exhaust plenum 49, a secondary gas port 42, a motorized proportional gas flow valve 41, connected to port 42 to automatically control the amount of secondary air to mix with the combustion exhaust gas and a temperature sensor, such as thermocouple 53, to measure gas temperature into the turbine inlet port 72.

The CHP system 100 also utilizes a high temperature heat exchanger 24 which includes a first port 55 for directing hot exhaust gas from the turbine 38 into the heat exchanger 24, a port 56 for directing cold exhaust gas out of the heat exchanger 24 to an optional secondary heat exchanger for useful secondary thermal use, an input port 57 for directing cold, high pressure, compressor air into the heat exchanger 24, and a port 58 for directing hot, high pressure, compressor air from the heat exchanger 24 into the combustion chamber 26. The high temperature heat exchanger 24 is configured to operate at temperatures as high as about 700° C. Heat exchangers capable of operating in the high temperature and pressure range needed for this application operate near the structural limits of the metals employed, typically made of stainless steel or nickel alloys. Therefore, accurate control of the temperature of the combustion gases is desired to ensure that the temperature limits of the high temperature heat exchanger 24 materials are not exceeded. It should be appreciated that such temperatures are at the end of metal heat exchangers structural capabilities and it is desired to provide accurate and precise control of the temperature of the combustion gas delivered to the high temperature heat exchanger 24.

In an embodiment, a single counter flow heat exchanger is employed to improve the thermal electric efficiency of the CHP system 100. It will be appreciated that other heat exchanger configurations are possible. In an embodiment a stainless steel or nickel alloy, single counter flow plate or tube style heat exchanger is employed, however, other types may be utilized as well, including, but not limited to, tube and shell, micro tube, microchannel, plate types, and the like. In an embodiment, the high temperature heat exchanger may be constructed of ceramic or nickel alloy steel. The control of the combustion gas temperature entering the high temperature heat exchanger 24 reduces cost in two ways. The first is that tightly controlling the temperature of the combustion cases to the high temperature heat exchanger 24 allows for the use of stainless steel heat exchangers instead of nickel alloys which are significantly more expensive. The second cost savings is in extended life of the heat exchanger lowering the maintenance cost over time. Power generation equipment typically has an expected twenty-year service period. Operating the high temperature heat exchanger at high pressure can experience higher thermal stresses which may result in component replacement in as little as 5 years. Reducing thermal stresses with well controlled combustion gas temperatures will extended the operational life which could lead to up to 25% reduction in maintenance cost. The advantages of using a heat exchanger is to recover heat energy from the turbine exhaust to pre-heat combustion air after compression.

The open cycle Brayton gas turbine system 22 further includes a turbine compressor 31 to compress ambient air, a fluid connection 32 (FIG. 1) from the turbine compressor 31 outlet to the combustion chamber pressure vessel 28 that carries compressed ambient air to the combustion chamber pressure vessel 28. The gas turbine system 22 also includes a fluid connection 37 from the cyclone outlet port 49 to the expansion turbine inlet port 72. The turbine expander 38 operates to expand the working gas and produce usable work, for example turning a generator 50 to generate electricity. The turbine system 22 also includes a fluid connection 39 from the outlet port 73 of the expansion turbine 38 to the inlet port 55 of the heat exchanger 24. The turbine system also includes a generator 50 connected to the shaft of the turbine to produce electrical power.

Figure 5:
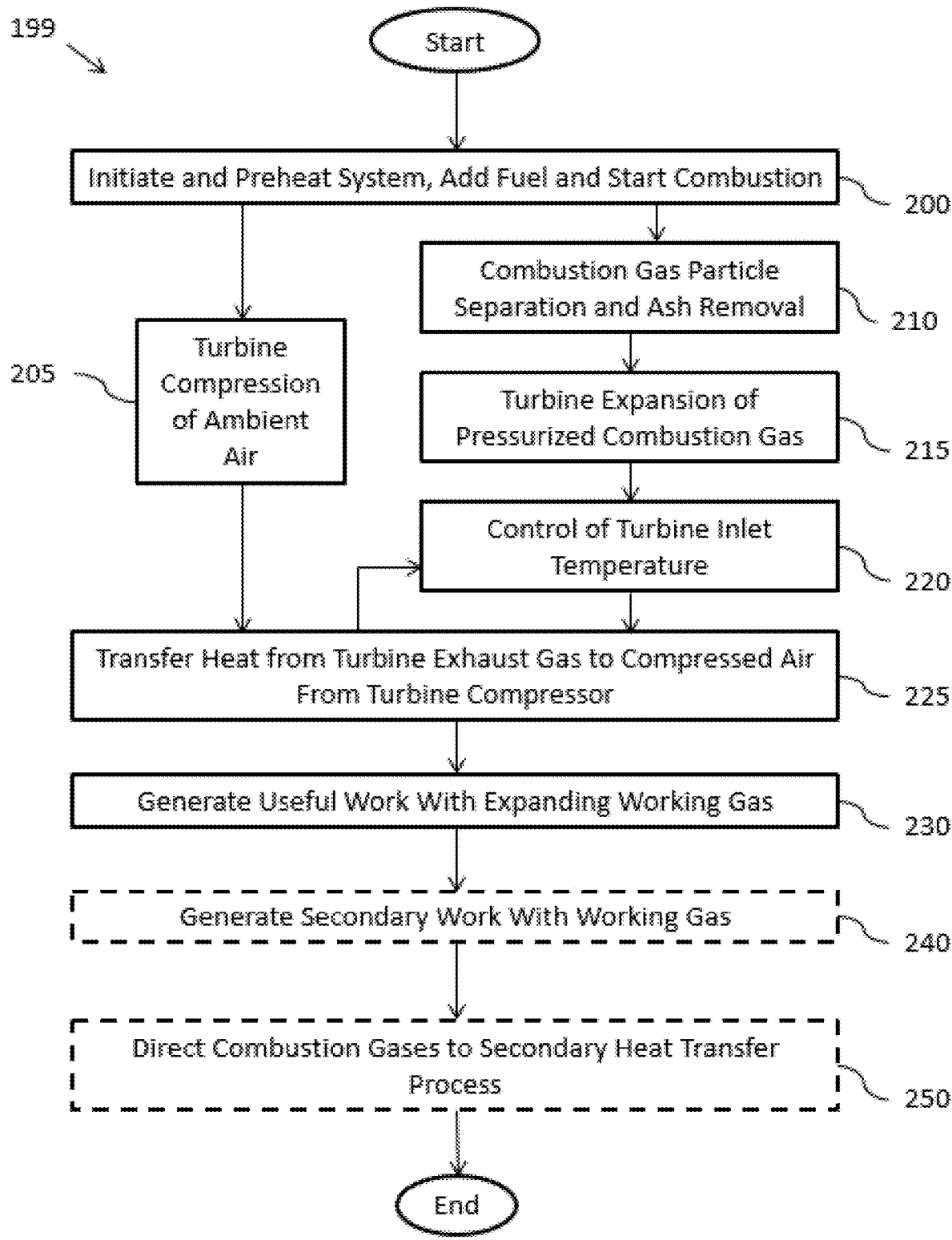
FIG. 5 is a flow diagram of a method of operating a combined heat and power system.

In an embodiment, the combustion gases exiting the high temperature heat exchanger 24 at port 56 may be passed through a low temperature heat exchanger 25 to reclaim further heat from the cooled combustion gases for lower temperature thermal applications as depicted at optional process step 250 (FIG. 5). For example, in an embodiment, the cooled combustion gases may be at temperatures of about 200° C. and may be used for low temperature applications, including, but not limited to hot water, low pressure steam, bottoming cycle power generation, absorption chilling, and the like. Further cooled combustion gases leave the low temperature heat exchanger 25 and may be exhausted or recycled if desired.

Referring to FIG. 2, with continuing reference to FIG. 1, depicts a pressurized solid fuel feed and ash removal system. In an embodiment, the pressurized feed system 20 further includes, but is not limited to, a gas valve 60 to hermetically seal the fuel feed system. A solenoid flow control valve 61 allows for depressurization of the feed system during refill and to allow the evacuating pressurized air to be used as the motive force for removing ash from the ash system. A pressurized feed hopper 63 holds organic solid fuel under pressure, a pressurized feed auger 64 transports fuel from the hopper 63 to the rotary valve 65, a pressurized rotary feed valve 65 meters the fuel under pressure and creates an air lock between the combustion chamber 26 and the fuel above the rotary valve 65, and a vertical fuel feed tube 47 to deliver fuel to the bottom of the combustion chamber 26. During operation, the rotary valve does not create an absolute or perfect seal or air lock in that gas can leak around the internal barrel of the valve as well as the open void space between the vanes which will transport pressurized gas to the low-pressure zone above the valve. This would normally create an efficiency loss due to compressed air not getting to the turbine to produce work. In addition, these gases can be hot and can cause a fire hazard as the gas propagates towards the fuel. The present embodiment takes advantage of the leakage to pressurize the feed system, which in an embodiment can take between 5 and 15 minutes, and as the feed system equalizes in pressure with the combustion chamber no more reverse flow occurs. The hopper volume can be sized with enough fuel for 1 to 6 hours of operation without having to refill which effectively reduces the loss of gas from leakage by an average of 90%. An additional advantage of the feed system is when the fuel hopper is refilled, the system depressurizes by opening a gas valve and allowing the gas to evacuate through the ash system and remove the ash pneumatically to the ash bin. This method also reduces or eliminates the need for a secondary compressor to pressurize the feed system and pressurized air source for the ash system.

FIG. 3 illustrates the gas leakage pathways through the rotary feed valve. In an embodiment, the rotary valve 65, further includes but is not limited to, a rotating barrel 89 for metering fuel into the combustion chamber 26 and a barrel housing 87 to maintain pressure across the valve and from leaking out of the system. In operation, the solid organic fuel is fed by gravity to the top of the rotary valve through inlet port 85. The fuel fills the rotary valve barrel cavity 86 while the barrel is rotating. The fuel in cavity 86 is transported to the underside of the rotary valve 65 and drops down by gravity through the combustion chamber feed tube 47. The empty cavity 88 in the barrel contains pressurized gas from the combustion chamber and as the barrel rotates transports this gas to the top side of the rotary valve 65. The rotating barrel in all rotary valves have a gap between the tip of the vane and the barrel housing 87. Rotary valves experience gas leakage both around the tips of the vanes as well as the volume of gas that is transported by the empty barrel cavities.

Referring now to FIG. 4, with continuing reference to FIGS. 1-3. a detailed description of the combustion and cyclone systems. In an embodiment, the combustion system 21 further includes, but is not limited to, a combustion chamber or housing 26 for burning of organic fuel to generate heat, a fuel feed tube 47 to deliver fuel to the bottom of the combustion chamber 26, at least one electric heater 51 for delivering heat for startup, a conical inlet plenum 80 to allow hot combustion air into the combustion chamber and to distribute the solid organic fuel from the center feed tube to the outer radius of the combustion chamber, and a plurality of air plenum tubes 81 located near tangentially to the outer radius of the combustion chamber. The plenum tubes 81 promote a high velocity, turbulent and cyclonic action within the combustion chamber 26.

The combustion further includes, a pressure vessel 28 which houses the combustion chamber 26 and provides for pressurized cooling air to flow around the combustion chamber 26. The pressure vessel 28 additionally functions to reduce or eliminate the differential pressure on the combustion chamber 26 components. The pressure vessel 28 receives compressed air from the turbine 22 and enters the pressure vessel 28 through port 82. Compressed air flows around combustion chamber 26 to provide a thermal break between the combustion chamber 26 and the wall of the pressure vessel 28. The compressed air then flows out of pressure vessel 28 and into the particle separator pressure vessel 29. The combustion system 21 also includes a rotary valve 65, fluidically coupled through feed tube 47 to the combustion chamber 26, a port 35 for delivering combustion air from the heat exchanger 24, an optional proportional valve 41 for metering the combustion air from the heat exchanger 24, a temperature sensor (e.g. thermocouple 52) to measure combustion gas temperature in the combustion chamber 26, and a controller 90 to receive various sensor inputs such as temperatures, valve positions, speeds and the like, as well as to control the various valves and electric motors in the system 100.

The combustion chamber 26 is designed to operate at the combustion gas temperature up to 1100° C. and is constructed of nickel alloy steels such as Hastalloy X and capable of withstanding higher thermal and mechanical stresses relative to refractory or ceramic components. The nickel alloys are also resistant to the abrasive and corrosive effects of the combustion gas. In an embodiment, the internal surfaces of the combustion chamber are coated with a ceramic composite coating to provide higher abrasion and corrosion resistance and thermal insulative properties. Some examples of coatings are Ytrium/Zirconium or Aluminum oxides. In an embodiment, the external surfaces of the combustion chamber 26 are coated with insulation to reduce the heat loss from the combustion chamber 26 to the cooling air flowing through the pressure vessel 28. The thermal insulation can be spray refractories or blanket insulation. During the startup of the system the electric heaters 51 are energized and heats up to 1000° C. while the turbine is rotating a low speed to provide a flow of air. Solid organic fuel is allowed to drop (e.g. via gravity) to the bottom of the combustor where at least some of the fuel comes into contact with the heaters and begins to ignite. In an embodiment, the flow of turbine air during start up is not sufficient to lift the material into suspension but does promote rapid ignition of the fuel. Once ignition occurs, the temperature sensor 52 will register an increase in temperature, at which point the turbine 22 will increase speed to accelerate the combustion air and lift the fuel into suspension.

In an embodiment, the particle separator 23 further includes a pressure vessel 29, housing a plurality of uni-flow cyclone particle separators 27, a disengagement hopper 71 for particulate collection, a cyclone ash valve 68 to pneumatically isolate the plurality of uni-flow cyclones during ash removal, a water cooled jacket 84 around the ash outlet to cool the particles, a solenoid flow control valve 70 to allow pressurized air from the fuel hopper to pneumatically remove particles from the hopper 71, and a solenoid flow control valve 69 to allow the particles to enter the ash bin 46. The particle separator 23 is designed to operate at the combustion gas temperature up to 1100° C. and is constructed of nickel alloy steels such as Hastalloy X and capable of withstanding high thermal and mechanical stresses in comparison with refractory or ceramic components. The nickel alloys are also resistant to the abrasive and corrosive effects of the combustion gas. In an embodiment, the internal surfaces of the cyclone are coated with a ceramic composite coating to provide higher abrasion resistance and thermal insulative properties. Some examples of coatings are Ytrium/Zirconium or Aluminum oxides. In an embodiment, the external surfaces of the Uni-flow cyclone particle separators 27 are coated with insulation to reduce the heat loss from the Uni-flow cyclone particle separators 27 to the cooling air flowing through the pressure vessel 29. The thermal insulation can be spray refractories or blanket insulation. The cyclone particle separator 23 also includes an exhaust plenum 49, a secondary gas port 42, a motorized proportional gas flow valve 41 fluidically connected to port 42 to automatically control the amount of secondary air to mix with the combustion exhaust gas and a temperature sensor, such as thermocouple 52, to measure gas temperature into the turbine inlet port 72. The pressure vessel 29 provides for pressurized cooling air to flow around the uni-flow cyclone particle separator 27. The pressure vessel 29 additionally functions to reduce or eliminate the differential pressure on the uni-flow cyclone particle separator 27 components. The pressure vessel 29 receives compressed air from the combustion chamber pressure vessel 28 and flows around the uni-flow cyclone particle separator 27 to provide a thermal break between the uni-flow cyclone particle separator 27 and the wall of the pressure vessel 29. The compressed air then flows out of pressure vessel 29 through port 83 to the heat exchanger 24.

Continuing now to FIG. 5, with continuing reference to FIG. 1-4, an embodiment is shown for a method 199 of controlling the combustion of a CHP system 100. In operation, the method 199 includes starting the CHP system 100 by turning on the turbine 22 and electric heaters 51. Ambient air is delivered into the combustion chamber 26 as depicted at block 200. In an embodiment, solid organic fuel is fed by the fuel feed system 20 into the bottom of the combustion chamber 26 via feed tube 47 in block 210. The combustion air is provided by the turbine compressor 31 in block 205, which passes through pressure vessels 28, 29 via fluid connection 32 and then through heat exchanger 24 and delivered to the combustion chamber 26 through fluid connection 35. Solid fuel is introduced through the valve 65 delivering the fuel to the bottom of the combustion chamber 26. Fuel deposits on the electric heaters which are at temperatures up to 1000 C where the material begins to combust. In an embodiment the rotary valve 65 is used to control the feed rate of fuel into the combustion chamber 26. When the temperature sensor 52 reaches 350° C. the turbine 22 is increased in speed to promote higher combustion rates and increase the temperature further. The valve 65 also increases the fuel feed in proportion to the combustion air flow until the desired operating temperature set point is reached and then the heaters 51 are turned off. In an embodiment, the rotary valve 65 may include multiple cavities and rotates to meter the amount of solid fuel entering the combustion chamber 26. It also functions as an air lock to prevent hot combustion gases from back flowing into the fuel feed and organic fuel storage.

For operations where the fuel is an organic material, it may be mixed and exhibit different heat values as well as varying moisture content. With such fuel, control of the air/fuel ratio is desired in order to maintain a more constant output temperature. Determining the moisture and heat value of the fuel stream entering the combustion chamber 26 is difficult and typically not very practical. Moreover, as a result of these inconsistencies, fluctuations in the exhaust gas temperatures can be significant. Therefore, control of the exhaust gas temperature after combustion is used to control the set point temperature desired for the turbine inlet port 72 in block 220.

In an embodiment, the target working temperature for the combustion process is about 1050° C., depending on the type of fuel being employed. It will be appreciated that other combustion working temperatures are possible for the combustion process and may be selected based on several factors. Higher temperatures are commonly desired for cleaner burning of fuel with lesser amounts of particulate emissions, hydrocarbon emissions e.g., Carbon Monoxide (CO) emissions, although higher combustion temperatures will increase Nitrous Oxide (NOx) emissions. In an embodiment, this makes the desired operating temperature of the combustion chamber to be between 1000° C. and 1100° C. This temperature range provides for a desired level of combustion while minimizing the NOx formation.

The combustion gas temperature is measured at the exit of the combustion chamber 26 by a temperature sensor 52 e.g. thermocouple, IR sensor semiconductor sensor, and the like, which is used to control the rotary valve 65 and the auger 64 feed rate of fuel to the combustion chamber 26 as well as the hot temperature gas to be directed to downstream processes. As the gas exits the combustion chamber 26, the temperature is measured by temperature sensor 52. The controller 90 has a defined set point temperature of what the average combustion temperature should be. In an embodiment, the controller 90 employs a time averaged temperature measurement to control the solid fuel rotary valve 65 speed to control the feed rate of the fuel. The rotary valve is configured to provide feed of the solid fuel into the combustion chamber 26 while also providing an air lock to minimize the reverse flow of combustion gases. Using a time averaged temperature measurement for control of the rotary valve allows the rotary valve 65 to maintain a more constant speed rather than responding to fluctuations in the output temperature of the combustion gas. The gas temperature leaving the combustion chamber 26 can be as high as 1100° C. which exceeds the maximum temperature for the turbine 22. The high temperature is desirable in order to achieve complete combustion and eliminate un-burnt hydrocarbon emissions.

Temperature sensor 52 is used to control the temperature of the combustion gases leaving the combustion chamber 26. It measures the instantaneous temperature of the gas and sends this to the controller 90. The time averaged value is used to compare with the combustion chamber 26 set point value and controls the amount of fuel and air needed to maintain the set point temperature. The instantaneous value is compared to the set point value in order to determine the amplitude of the deviation from the set point value. Temperature sensor 53 (FIG. 1) is used to sense the temperature of the exhaust gas entering the expansion turbine 38. The temperature of the gas indicates to the controller 90 to either increase or decrease the gas flow from the proportional valve 41 into fluid connection 37 to adjust the turbine inlet gas temperature to the desired set point as depicted in process step 220. When sensor 53 measures a deviation from the set point temperature controller 90 begins to adjust valve 41 in anticipation of the exhaust gas reaching the turbine port 72. A first control process will open or close the valve to a predetermined position based on the temperature of the secondary gas. Once the combustion gases in the combustion system 21 and the gas at the expansion turbine 38 reaches the desired setpoint temperature the system 100 can start to produce useful work.

In an embodiment, the compression turbine draws ambient filtered air and compresses the air to the desired pressure ratio relative to the power output as depicted in block 200. The compressor turbine 31 and expansion turbine 38 are mechanically coupled by a common shaft and turn at equal speeds. The speed and pressure ratio are controlled by controller 90 in response to the power demand on the turbine 22. The compressed air flows through the combustion system 21 as depicted in process step 200 and then flows to the heat exchanger 24 as depicted in process step 225.

Advantageously, in an embodiment, the turbine 22 is connected to the high temperature heat exchanger 24 through an independent gas circuit which allows for a method of transferring heat from the expansion turbine 38 exhaust into the combustion air from the turbine compressor 31 in block 225. As depicted at process step 225, the turbine 22 pulls the clean working gas (e.g., ambient air from the environment) into the inlet of the compressor 31 where the working gas is compressed. The compressed gas is fed through a fluid connection 32 to the combustion pressure vessel 28 and flows through a plenum around the combustion chamber 26 and then into the particle separator pressure vessel 29 where it exits flows through a plenum around the particle separator. The air then flows through fluid connection 33 to the high pressure, cold side inlet port 57 of the high temperature heat exchanger 24.

The compressed working gas is heated by the exhaust gas exiting the expansion turbine 38 by extracting heat from the combustion gases flowing through a separate channel in the heat exchanger 24. Low pressure hot exhaust gas exiting the expansion turbine 38 flows through fluid connection 39 to the inlet port 55 of heat exchanger 24. Heat from the exhaust gas is transferred to the compressed air going to the combustion chamber and exits the heat exchanger 24 through port 56. The remaining heat can be utilized for further uses as described in optional blocks 240 and 250. The heated compressed air travels from the heat exchanger port 58 through a fluid connection 35 to the inlet plenum 80 of the combustion chamber 26. The hot compressed air then flows through a plurality of tubes 81 into the hot combustion chamber 26 to induce a cyclonic action and to combust with the solid fuel as depicted in block 200.

Advantageously, in an embodiment, as depicted in block 210, the combustion gases leaving the combustion chamber 26 flows through fluid connection 36 into a plurality of uni-flow cyclone particle separators 27 where particles above 10 microns are removed from the combustion gas. The ash is collected in the ash hopper 71 and is periodically removed through fluid connection/conduit 45. An ash bin valve 69 opens to allow pressurized air in conduit 48 from the fuel hopper 63 to pneumatically transport the ash into the ash bin 46. The cyclone also has a valve which isolates the cyclone during the ash removal to maintain the higher cyclone pressure during operation. The cleaned combustion gases then exit the cyclone through outlet port 49 to the turbine inlet port 72.

In an embodiment, the exhaust gas leaving outlet port 49 is at temperatures above 1000° C. and exceeds the turbine inlet temperature limit. As depicted in block 220, a proportional valve 41 is fluidically coupled to fluid connection 35 from the heat exchanger 24. Hot compressed air from heat exchanger 24 is allowed to flow through port 42 and mix with the combustion gases in fluid connection 37. Temperature sensor 53 is used to control the proportional valve 41 to reduce the temperature of the combustion gases to the desired turbine inlet temperature setpoint.

The combustion gases then pass through the expansion turbine 38 where useful work is generated in the form of shaft powered depicted at block 230. In an embodiment, the turbine shaft is connected to a generator 50 to convert this work into electric power. In another embodiment, the usable work is used to perform a manufacturing process. For example, the usable work could be used to run a pump or other mechanical processes such as mechanical chillers, compressors, vapor compression distillation, conveyance equipment and the like.

In an embodiment, after expansion the hot turbine working gases are then utilized for several reasons to improve the efficiency and effectiveness of the CHP system 100. The first is that the hot working gases are employed to provide high temperature combustion air to the combustion system 21 as depicted at block 225. Another reason is to provide high temperature (700° C.), clean, exhaust gas for generating additional shaft power through the use of a second cycle as depicted at optional block 240. The turbine exhaust working gas can be used for second cycle power generation for example in a second cycle ORC system to generate further work or electricity. In an embodiment, about 80 percent of the combustion input heat energy, present in the exhaust gas is available for a secondary cycle use. In an embodiment, the secondary cycle may be for power generation, as described herein, or for other uses such as but not limited to water purification, desalination, and drying material for example. For example, while the primary function of the heated expanded working gas from the expansion turbine 38 is to provide combustion air preheating via heat exchanger 24 as described in block 225, the hot turbine gas may be employed for additional heat transfer or work generation. In an embodiment, the working gas temperature at fluid connection 39 is about 700° C. and would not utilize heat exchanger 24 but instead flow to the hot heat exchanger for the second cycle. The second cycles may be arranged in series or parallel.

Advantageously, for a system 100 sized to generate 75 kW in electrical power, and additional 40 kW-150 kW of additional power may be generated from a second cycle process. For example, a low temperature ORC utilizing the available waste heat could produce an additional 40 kW, while a high temperature ORC could produce an additional 75 kW. Higher efficiency cycles such as closed regenerative Brayton, Stirling or super critical CO2 engines could produce in excess of 100 kW of additional power. Further cooled working gas leaving the second cycle process may be exhausted. Moreover, in some embodiments, following the second cycle process, the cooled working gas may be utilized for any further lower temperature process to reclaim any residual heat as depicted in process step 250, and may even be recycled to start the process again.

In an embodiment, the hot working gas leaves the expansion turbine 38 through a fluid connection 39. Fluid connection 39 may also be coupled to an external thermal system to utilize the hot gas as depicted in process step 250. The thermal applications can utilize the turbine exhaust gas with heat exchanger 24 for lower temperature (250° C.) applications or without heat exchanger 24 for high temperature (700° C.) applications. In an embodiment, turbine exhaust gas flows through fluid connection 39 to the high temperature application which may or may not include a heat exchanger. Applications include high temperature drying applications, sludge drying, thermal water purification and space heating and cooling. In another embodiment, turbine exhaust gas exiting the heat exchanger 24 at port 56 may be passed through a low temperature heat exchanger 25 to reclaim further heat from the cooled combustion gases for lower temperature thermal applications as depicted at optional block 250. For example, in an embodiment the cooled exhaust gas may be at temperatures of less than 250° C. and may be used for low temperature applications, including, but not limited to hot water, low pressure steam, bottoming cycle power generation, absorption chilling, and the like. Further cooled combustion gases leave the low temperature heat exchanger 25 and may be exhausted or recycled if desired.

The term "about" is intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A combined heat and power system comprising:
   a combustion chamber configured to directly combust solid organic material;
   a compressor turbine fluidly coupled to the combustion chamber;
   an expansion turbine fluidly coupled to the combustion chamber;
   wherein a compressor turbine pressure ratio is less than 8;
   a uni-flow cyclone fluidly coupled between the combustion chamber and the expansion turbine;
   a fuel feed system fluidly coupled to the combustion chamber, the fuel feed system having a hopper configured to receive the solid organic material and a feed tube disposed between the hopper and the combustion chamber, wherein the hopper is sized to provide fuel to the combustion chamber for 1 to 6 hours of operation;
   a metering device disposed between the hopper and the feed tube, the metering device being configured to selectively flow pressurized gas from the combustion chamber to the hopper; and
   an ash bin operably coupled to the uni-flow cyclone and fluidly coupled to the hopper by a flow control valve, wherein the flow control valve is configured to flow pressurized air from the hopper to the ash bin prior to the hopper being refilled with solid organic fuel.

2. The system of claim 1, wherein the compressor turbine pressure ratio is less than 4.

3. The system of claim 1, further comprising a generator operably coupled to the expansion turbine.

4. The system of claim 1, further comprising a second cycle system thermally coupled to an output of the expansion turbine.

5. The system of claim 4, wherein the second cycle system is one of an organic Rankine cycle, closed regenerative Brayton, Stirling or super critical carbon dioxide ($CO_2$) engines.

* * * * *